United States Patent
Uehira et al.

(10) Patent No.: US 6,880,254 B2
(45) Date of Patent: Apr. 19, 2005

(54) TORQUE DETECTOR

(75) Inventors: Kiyotaka Uehira, Osaka (JP);
Kiyotaka Sasanouchi, Osaka (JP);
Junichi Yukawa, Nara (JP); Koji Oike, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/491,842
(22) PCT Filed: Jun. 16, 2003
(86) PCT No.: PCT/JP03/07599
§ 371 (c)(1),
(2), (4) Date: Apr. 5, 2004
(87) PCT Pub. No.: WO03/106953
PCT Pub. Date: Dec. 24, 2003

(65) Prior Publication Data
US 2004/0244209 A1 Dec. 9, 2004

(30) Foreign Application Priority Data
Jun. 17, 2002 (JP) ........................................ 2002-175471

(51) Int. Cl.[7] ................................................ G01B 7/00
(52) U.S. Cl. ...................... 33/1 PT; 33/708; 73/862.333
(58) Field of Search ............................... 33/1 PT, 1 N, 33/706, 708, 600, 606, 612, 412; 73/118.1, 862.331, 862.332, 862.333, 862.334, 862.335, 862.336

(56) References Cited

U.S. PATENT DOCUMENTS

| | | | | |
|---|---|---|---|---|
| 4,660,669 A | * | 4/1987 | Shimizu ..................... | 180/444 |
| 5,025,563 A | * | 6/1991 | Rennerfelt ................... | 33/1 N |
| 5,442,956 A | * | 8/1995 | Persson ...................... | 73/118.1 |
| 6,341,426 B1 | * | 1/2002 | Okumura .................... | 33/1 PT |
| 6,481,296 B1 | * | 11/2002 | Jin et al. ................ | 73/862.331 |
| 6,507,188 B1 | * | 1/2003 | Dilger et al. ........... | 324/207.25 |
| 6,618,688 B1 | * | 9/2003 | Schodlbauer ............... | 702/151 |
| 6,737,638 B1 | * | 5/2004 | Schmidt et al. ......... | 250/231.15 |
| 6,804,888 B1 | * | 10/2004 | Nishikawa et al. ......... | 33/1 PT |
| 6,837,116 B1 | * | 1/2005 | Desbiolles ............. | 73/862.335 |

FOREIGN PATENT DOCUMENTS

| | | |
|---|---|---|
| JP | 11-194007 | 7/1999 |
| JP | 11-230838 A | 8/1999 |
| JP | 2002-122495 A | 4/2002 |
| WO | WO 00/08434 A1 | 2/2000 |
| WO | WO 00/34746 A1 | 6/2000 |

OTHER PUBLICATIONS

International Search Report for application No. PCT/JP03/07599 dated Sep. 24, 2003.
Microfilm of the specification and drawings annexed to the request of Japanese Utility Model Application No. 171217/1986 (Laid–Open No. 75813/1988), (Toyota Motor Corp.), May 20, 1988 and a partial English translation.

* cited by examiner

Primary Examiner—Diego Gutierrez
Assistant Examiner—Amy R. Cohen
(74) Attorney, Agent, or Firm—RatnerPrestia

(57) ABSTRACT

A torque detector capable of detecting an amount of torque, rotation angle and rotational speed with high resolution. First rotor and second rotor are retained individually in bearings, and they each have a gear on periphery thereof. First magnet and second magnet have pairs of magnetic poles, and disposed to ends of the first rotor and the second rotor respectively. First and second magneto-sensitive elements for detecting magnetic fields produced by the first and the second magnets are placed along an axial direction of the first and the second rotors in a manner to face the first and the second magnets respectively with a predetermined space. An input shaft and an output shaft are in engagement to the first and the second rotors respectively with gears, and the output shaft is connected to the input shaft.

12 Claims, 10 Drawing Sheets

TORQUE DETECTOR

This Application is a U.S. National Phase Application of PCT International Application PCT/JP03/07599.

TECHNICAL FIELD

The present invention relates to a torque detector used for a power steering system and the like of an automobile. In particular, the invention relates to a torque detector which is capable of detecting an angle of rotation of a steering wheel at the same time with a torque.

BACKGROUND ART

Among conventional methods hitherto known for detecting torque and rotation angle, one method is disclosed, for example, in Japanese Unexamined Patent Publication, No. H11-194007. FIG. 13 shows the method of detection disclosed therein.

In a torque detector of FIG. 13, gears 126a and 126b are mounted in a manner to make engagement via linkage springs 127a and 127b to their respective shafts (not show in the figure) of which a rotation angle is to be detected.

These gears 126a and 126b engage with gears 129a and 129b respectively. Gears 129a and 129b bear coded disks 128a and 128b mounted respectively thereto, each of which is provided with a plurality of magnetic poles on a periphery thereof. The magnetic poles provided around coded disks 128a and 128b move with rotation of the shafts, of which a rotation angle is to be detected. Detector elements 130 and 131 are mounted in positions, each facing the periphery of respective one of coded disks 128a and 128b, and they count a number of the magnetic poles traveling over them for detection of a rotation angle of the shafts.

A mechanism of the above structure is mounted in engagement with two shafts which are connected to each other through a torsion bar. In this case, the torque detector detects an amount of torque acting between the two shafts by comparing two rotation angles detected individually on the shafts, when the torque produces a twist between them.

In the torque detector constructed as above, detector elements 130 and 131 disposed in positions lateral to the shafts detect magnetic fields generated by the magnetic poles on the peripheries of coded disks 128a and 128b. Therefore, for example, it is liable to variation in detecting accuracy due to changes in spaces between coded disks 128a and 128b and detector elements 130 and 131 in relation to gears 126a and 126b, if any of gears 129a and 129b and coded disks 128a and 128b receives an external force in a direction orthogonal to their axes during the assembling process.

Furthermore, this torque detector of the prior art uses the magnetic fields generated by the magnetic poles of coded disks 128a and 128b for detection by detector elements 130 and 131. Therefore, it has a limitation in resolution of the detection which is determined by a dimension of intervals of the magnetic poles, and it is hence difficult to detect with high resolution a small movement of the steering wheel, an amount of torque, a rotation angle and a rotational speed at the initial state when the wheel begins being turned.

SUMMERY OF THE INVENTION

The present invention is intended to provide a highly accurate torque detector capable of detecting amount of torque, rotation angle and rotational speed with high resolution.

The torque detector of this invention has a case, and shaft bearings disposed to the case. Furthermore, a first rotor and a second rotor, each provided with a gear around the periphery of it, are retained in their respective shaft bearings in a rotatable manner.

A first magnet having a pair of magnetic poles is disposed to an end of the first rotor. A second magnet having a pair of magnetic poles is disposed to an end of the second rotor.

A first magneto-sensitive element for detecting magnetic field of the first magnet is mounted in a position facing the first magnet with a given space along an axial direction of the first rotor. A second magneto-sensitive element for detecting magnetic field of the second magnet is mounted in a position facing the second magnet with a given space along an axial direction of the second rotor.

An input shaft has a gear in engagement with the gear of the first rotor. An output shaft is connected to one end of the input shaft, and has a gear in engagement with the gear of the second rotor.

When there occurs a certain amount of relative displacement in rotation between the input shaft and the output shaft, the torque detector obtains the amount of relative rotational displacement based on a first detection signal output by the first magneto-sensitive element responsive to the magnetic field of the first magnet and a second detection signal output by the second magneto-sensitive element responsive to the magnetic field of the second magnet.

DETAILED DESCRIPTION OF THE PREFERRED EMBODIMENTS

Referring to the accompanying drawings, detailed description of exemplary embodiments of the present invention is provided hereinafter.

(First Exemplary Embodiment)

Figure 1:
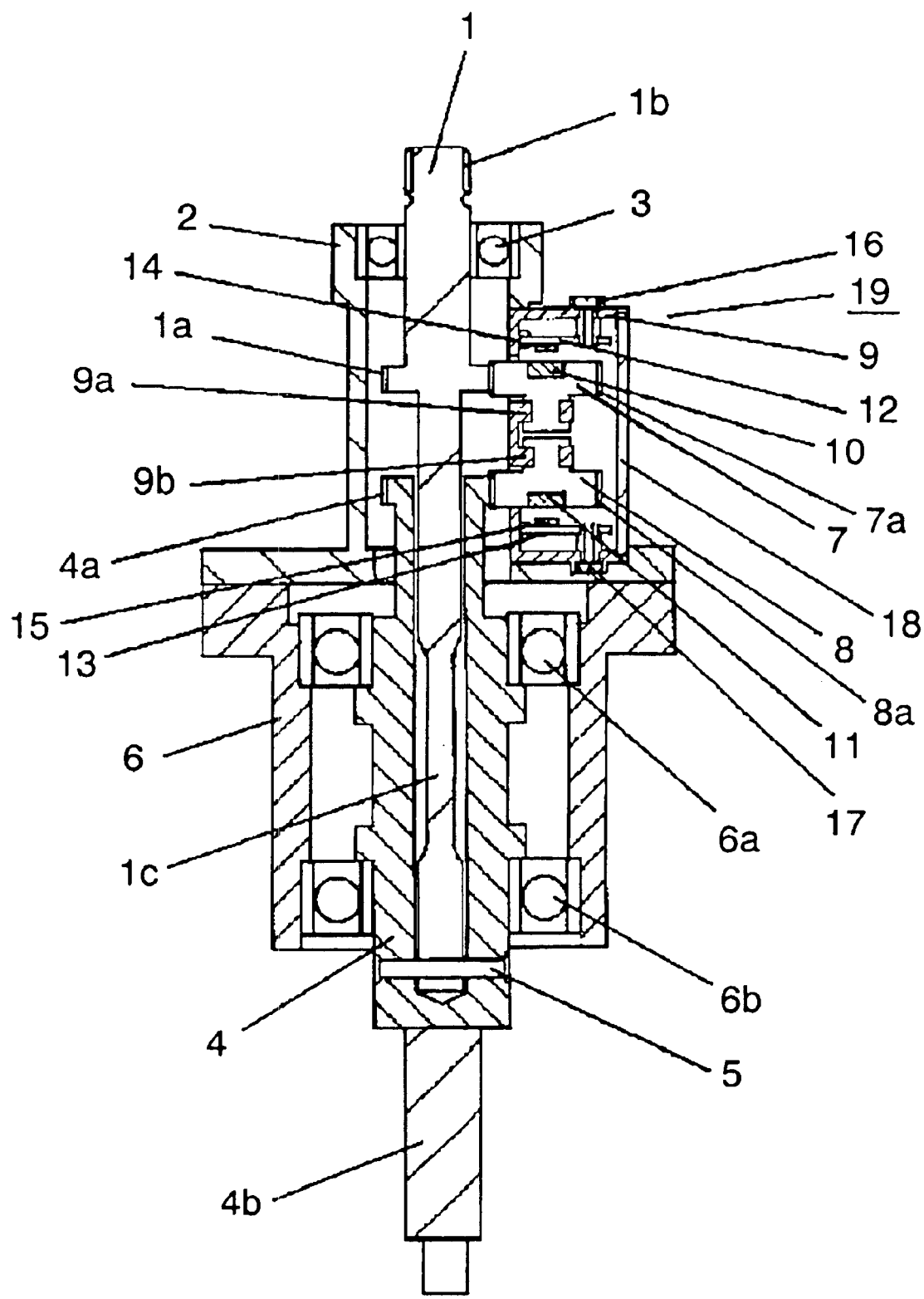
FIG. 1 is a sectional view of a torque detector according to a first exemplary embodiment of the present invention.

FIG. 1 is a sectional view showing a torque detector of a first exemplary embodiment of this invention. In FIG. 1, input shaft 1 is retained in a rotatable manner by bearing 3 disposed to upper housing 2. Input shaft 1 is provided with gear 1a on a portion thereof, and with spline 1b at one end for inputting. Spline 1b is coupled with a spline (not show in the figure) provided at a steering wheel side of a vehicle, and transmits rotation of the steering wheel to input shaft 1. Input shaft 1 has middle portion 1c of a smaller diameter to constitute a torsion bar for provision of a predetermined strength to twisting force. The other end of input shaft 1 is inserted coaxially into a hollow space of output shaft 4, and it is linked at the tip to output shaft 4 with connector pin 5.

Output shaft 4 is retained in a freely rotatable manner by bearings 6a and 6b held inside lower housing 6. Output shaft 4 has gear 4a at one end thereof, and worm gear 4b formed near the other end for outputting.

Worm gear 4b is in engagement with a rack wheel (not show in the figure) attached to another member at a wheel side of the vehicle, and transmits rotation of the steering wheel to the wheel side member.

Gear 1a of input shaft 1 and gear 4a of output shaft 4 are in engagement with gears 7a and 8a provided on rotors 7 and 8 respectively.

These rotors 7 and 8 are retained individually in a rotatable manner by shaft bearings 9a and 9b provided in sensor case 9. In addition, rotors 7 and 8 are provided with magnets 10 and 11 at generally the center portions of their respective ends, as shown in FIG. 2. Magnets 10 and 11 are magnetized in the same orientation as the end plane of rotors 7 and 8.

Magneto-sensitive elements 14 and 15 are mounted on printed circuit boards 12 and 13 in positions facing magnets 10 and 11 respectively in such orientations that are parallel with directions of the magnetic fields produced by magnets 10 and 11.

Figure 2A:
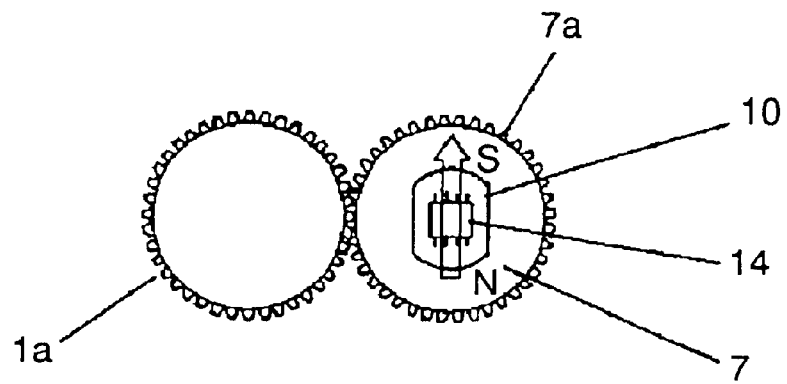
FIG. 2A and FIG. 2B illustrate movement of a magnet for magnetic detection in the torque detector according to the first exemplary embodiment.
Figure 2B:
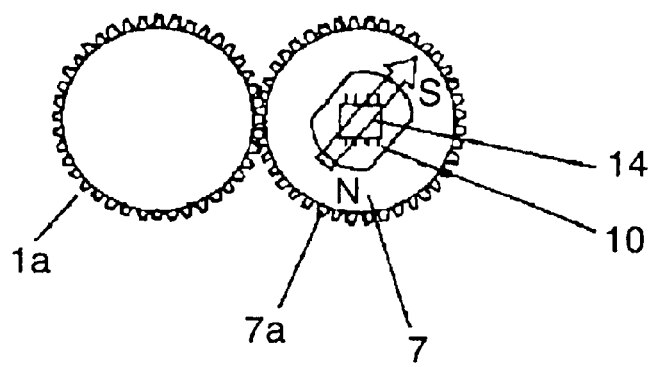

The directions of the magnetic fields produced by magnets 10 and 11 change, as shown in FIGS. 2A and 2B, for instance. Magneto-sensitive elements 14 and 15 used here are such elements that have a characteristic of producing a continuous output responsive to the change in direction of the magnetic field. To be more specific, anisotropic magneto-resistive elements are employed.

Positional arrangement of these magnets is not limited to that described above, but they can be arranged in any manner as long as the magnetic fields they produce change in direction with rotation of the individual rotors, and the changes are detectable by magneto-sensitive elements 14 and 15.

Printed circuit boards 12 and 13 are fixed to their respective positions in sensor case 9 by mounting screws 16 and 17. These components are housed inside sensor case 9 and hermetically sealed by sensor cover 18, to compose sensor unit 19.

Sensor unit 19 is provided with openings in portions of the case. Gear 1a and gear 4a engage with rotor 7 and rotor 8 respectively through these openings and similar openings provided in upper housing 2. Sensor unit 19 is set in position on any of upper housing 2 and lower housing 6 and secured to it by means of a screw and the like (not show in the figure).

The torque detector constructed as above operates in a manner which is described hereinafter.

A turning torque of the steering wheel is transmitted to input shaft 1 through spline 1b. The turning, or rotation, of input shaft 1 is then transmitted to output shaft 4 by connector pin 5 fixed to it, and rotates worm gear 4b. This rotation manipulates the wheels of the vehicle.

If there is no friction, or no load on the wheels' side, input shaft 1 and output shaft 4 make completely synchronous rotation. Therefore, gears 1a and 4a provided on both shafts also rotate in the same phase. Since these gears 1a and 4a are in engagement with rotors 7 and 8 which are held in a freely rotatable manner, these rotors 7 and 8 rotate according to an angle of rotation and a gear ratio between the gears of input shaft 1 and output shaft 4.

Magnets 10 and 11 mounted to these rotors 7 and 8 also rotate respectively. This changes directions of polarities of magnets 10 and 11, as shown in FIG. 2B. That is, directions of magnetic fields produced respectively by magnets 10 and 11 change accordingly.

Although FIG. 2B shows magnet 10 and gear 1a, magnet 11 and gear 4a works in the same manner.

In the above instance, outputs produced by magneto-sensitive elements 14 and 15 corresponding to changes in the directions of magnetic fields become exactly the same, since rotors 7 and 8 rotate in exactly the same phase.

Figure 2C:
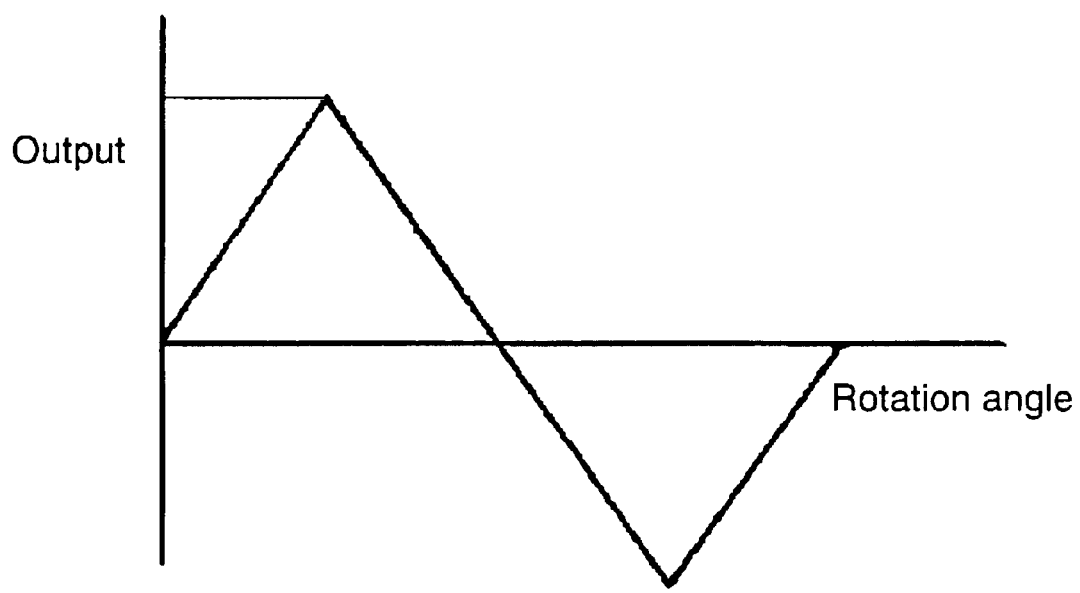
FIG. 2C illustrates changes in output of a magneto-sensitive element according to the first exemplary embodiment.

FIG. 2C shows the change in outputs of magneto-sensitive elements 14 and 15 corresponding to rotation angles of rotors 7 and 8.

When there is a load placed on the wheels, a counter-torque of this load acts upon input shaft 1 at the side of output shaft 4 to countervail against the turning torque of the steering wheel. As a result, a twisting torque acts on input shaft 1. Consequently, rotation of gear 4a of output shaft 4 shifts in phase from gear 1a of input shaft 1, which causes a shift in phase of rotation between rotor 7 and rotor 8 in proportion to an amount of the twist. Therefore, magnets 10 and 11 rotate respectively in a manner that the directions of their magnetic fields shift with respect to each other. Accordingly, magneto-sensitive elements 14 and 15 produce outputs of such values that correspond to the shift in phase of the magnetic fields.

Therefore, it is possible to detect the amount of the twist, i.e. the torque that works between input shaft 1 and output shaft 4, by comparing the outputs of magneto-sensitive elements 14 and 15, or a difference therebetween.

The magneto-sensitive elements detect rotation angles of rotors 7 and 8 in analog values. Input shaft 1 and output shaft 4 engage with rotors 7 and 8 respectively via gears 1a and 7a, and gears 4a and 8a. Angles representing positions of input shaft 1 and output shaft 4 in their one complete rotation can therefore be obtained from absolute values of the respective outputs of magneto-sensitive elements 14 and 15.

In the torque detector according to this exemplary embodiment, magneto-sensitive elements 14 and 15 are disposed in positions orthogonal to the axes of rotors 7 and 8 respectively, as described above. It is therefore unlikely that the torque detector receives any adverse influence of external force or flexion upon distances between magneto-sensitive element 14 and magnet 10, and between magneto-sensitive elements 15 and magnet 11, even if the detector is subjected to the flexion caused by external force during the assembling process.

The torque detector is especially free from any influence of displacement of gears in their radial directions due to the effect of external force placed in the directions orthogonal to the axes. The structure can thus provide the torque detector with high accuracy and high reliability in detecting the torque and rotation angle, without receiving an influence of the flexion.

Two magneto-sensitive elements 14 and 15 detect the changes in directions of the magnetic fields continuously while rotors 7 and 8 make one complete rotation. That is, magneto-sensitive elements 14 and 15 disposed in parallel to the magnetic fields detect in analog values the changes in direction of the magnetic fields produced by magnets 10 and 11, each having a pair of magnetic poles and fixed to first rotor 7 and second rotor 8. It is thus possible to determine absolute values of rotation angles (i.e., absolute angles) of the respective shafts.

Furthermore, it is also possible to determine a value of torque using a twisting angle obtained from the difference of angles between input shaft 1 and output shaft 4, when the twist occurs due to the torque acting between input shaft 1 and output shaft 4. As a result, the torque detector can prevent an adverse influence such as changes in the space due to an external force during mounting, and can improve reliability. In addition, it can obtain absolute values of the rotation angles of the shafts by directly measuring the two outputs simultaneously.

As described above, this torque detector obtains the outputs corresponding to the rotation angles of the shafts continuously in analog values, without using the conventional method which detects changes in number of magnetic poles among a plurality of them, and records them incrementally. Accordingly, the torque detector of this simple structure can detect not only a relative angle of twisting and a value of torque calculated from it, but also absolute values of the rotation angles of input shaft 1 and output shaft 4.

In this exemplary embodiment, sensor unit 19 is composed as a separate unit containing rotors 7 and 8 and magneto-sensitive elements 14 and 15. Thus, the torque detector can be constructed in the following manner.

First, input shaft 1 and output shaft 4 are assembled. Sensor unit 19 is then mounted unitary to the combination of input shaft 1 and output shaft 4.

This structure can improve workability and productivity in the assembling processes because the processes can be separated into individual blocks.

(Second Exemplary Embodiment)

Figure 3:
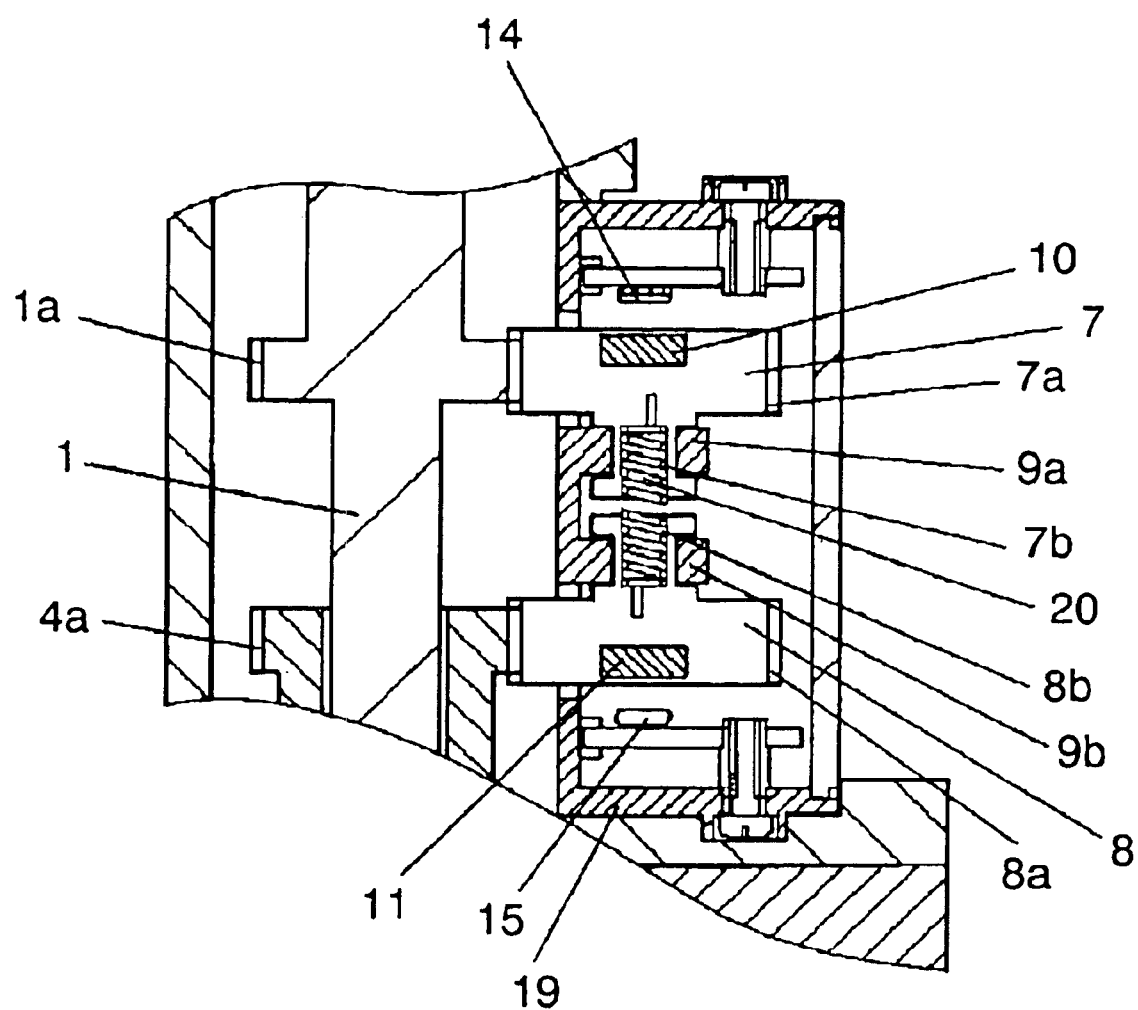
FIG. 3 is a sectional view of a torque detector according to a second exemplary embodiment of the present invention.

FIG. 3 is a sectional view depicting a sensor unit in a torque detector according to a second exemplary embodiment of this invention.

In the following description of this and the subsequent exemplary embodiments, the same reference numerals as those of FIG. 1 and FIG. 2 are used to denote the same elements, and their descriptions will be omitted.

In FIG. 3, rotors 7 and 8 formed of molded plastic material or the like have hollow portions 7b and 8b inside their shafts.

These hollow portions 7b and 8b contain coil spring 20 inserted therein. One end of coil spring 20 is fixed to the bottom of hollow portion of rotor 7, and the other end to the bottom of hollow portion of rotor 8 with a predetermined amount of torsion. A twisting torque of coil spring 20 therefore thrusts rotors 7 and 8 in the opposite directions with respect to each other. At the same time, a tensional force of this coil spring 20 thrusts rotors 7 and 8 in their axial direction so that rotors 7 and 8 are pressed against bottom faces of shaft bearings 9a and 9b in a manner to hold them freely rotatable at all the time.

The pair of rotors 7 and 8 of the structure described above are in engagement with gears 1a and 4a provided on input shaft 1 and output shaft 4.

In this structure, gears 7a and 8a of rotors 7 and 8 are thrust to their respective directions by the twisting torque of opposite directions so that they engage with only one side of cogs of the respective gears on input shaft 1 and output shaft 4. In addition, looseness between rotors 7 and 8 and shaft bearings 9a and 9b in their axial direction is absorbed because rotors 7 and 8 are thrust in one directions to each other by the compressing force of coil spring 20. This structure therefore maintains spaces of a given distance between magnets 10 and 11 mounted to rotors 7 and 8 and magneto-sensitive elements 14 and 15 without causing changes attributable to the looseness. The structure thus prevents variations in outputs due to the looseness.

Furthermore, the structure never allows looseness in engagement of the cogs due to backlash and the like of the gears. In other words, it does not produce a rotational error between shaft side gears 1a and 4a and rotors 7 and 8 to cause adverse effect to the detection of angles. It can therefore allow relaxation of preciseness in fabrication of the components. This invention can thus provide a highly reliable and accurate torque detector at low cost.

In this embodiment, the coil spring is used as a flexible member. However, other materials having the properties of producing twisting torque and compressing force, such as a thin wire, rubber, plastic resin and the like may also be used to obtain the like advantages.

(Third Exemplary Embodiment)

Figure 4A:
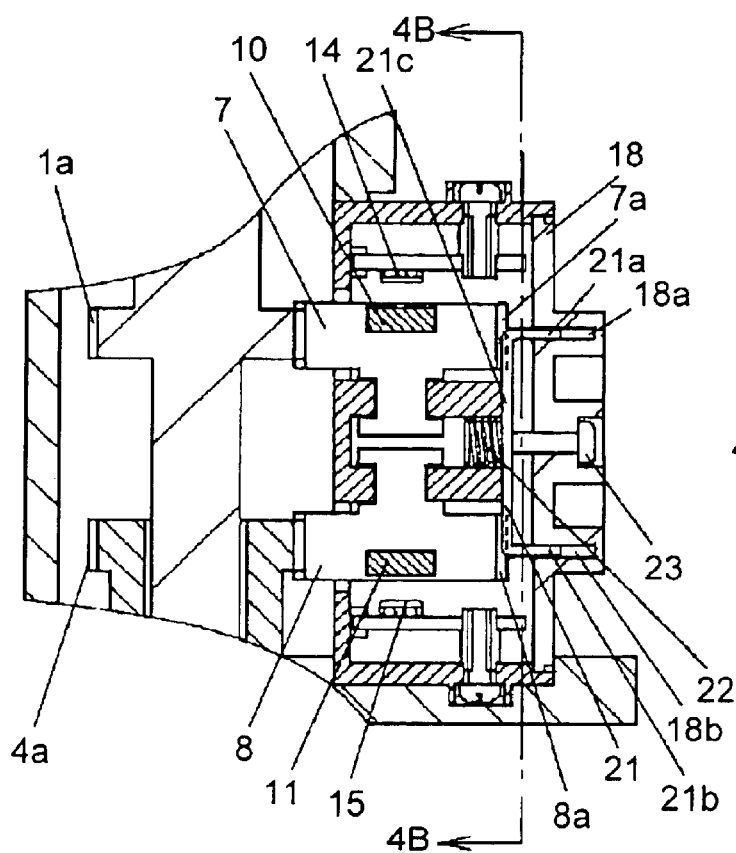
FIG. 4A is a sectional view of a torque detector according to a third exemplary embodiment of the present invention.
Figure 4B:
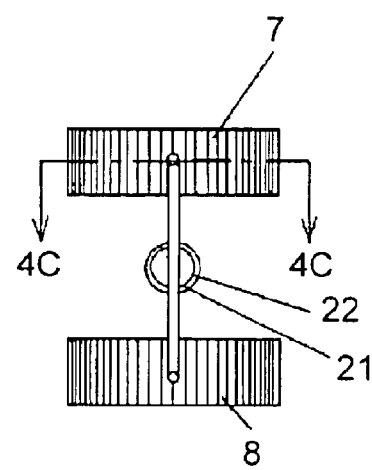
FIG. 4B is a lateral view as observed in a plane along a chain line toward arrows B–4B of the torque detector according to the third exemplary embodiment.
Figure 4C:
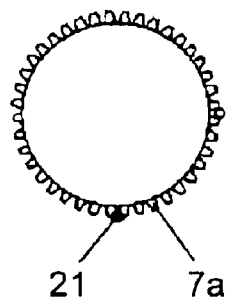
FIG. 4C is a sectioned view observed in a plane along a chain line toward arrows C–4C of the torque detector according to the third exemplary embodiment.

FIGS. 4A, 4B and 4C shows a structure of a sensor unit in a torque detector according to a third exemplary embodiment of this invention.

In FIGS. 4A, 4B, and 4C, stopper 21 made of a wire having a diameter appropriate for a width of tooth spaces of gears 7a and 8a is formed into a shape of generally the letter U. Two parallel portions 21a and 21b of stopper 21 are inserted into guides 18a and 18b of circularly drilled holes provided in sensor cover 18 in a freely slidable manner. Base portion 21c of the U-shaped stopper 21 is located in parallel with the tooth spaces of gears 7a and 8a on rotors 7 and 8, and in such a position that it engages with the tooth spaces. In addition, this base portion 21c of stopper 21 is thrust at all times by tension spring 22 attached to sensor case 9 in a direction away from the tooth spaces of the individual rotors. Accordingly, base portion 21c is in contact with screw 23 mounted to sensor cover 18 provided at the opposite side of tension spring 22, thereby movement of stopper 21 is restricted.

Stopper 21 constructed as above operates in a manner which is described hereinafter.

When a torque detector is manufactured, angular positions of rotors 7 and 8 and positions of magnets 10 and 11 are adjusted and fixed so that magneto-sensitive elements 14 and 15 produce predetermined initial outputs.

Assume here that sensor unit 19 and the input-output shaft combination described previously are manufactured separately. In this case, it is necessary that angular positions (initial positions) of rotors 7 and 8 in the sensor unit 19, of which outputs are pre-adjusted, match precisely to the initial positions of gears 1a and 4a on the shafts. In the manufacturing and assembling processes, the following procedures are carried out after the above adjustment of the positions, in order to prevent shifting from the initial positions.

Screw 23 is tightened through sensor cover 18 to push stopper 21 in a manner that base portion 21c engages with tooth spaces of gears 7a and 8a of rotors 7 and rotor 8. Gears 7a and 8a are thus fixed and prevented from shifting.

Screw 23 is loosened after gears 7a and 8a of rotors 7 and 8 are engaged respectively to the corresponding gears 1a and 4a on the shafts. Then, stopper 21 is disengaged from the tooth spaces because it is pushed back by tension spring 22. Accordingly, rotors 7 and 8 having gears 7a and 8a in engagement with gears 1a and 4a of the shafts are now free to rotate.

Stopper 21 of this embodiment has a simple structure, yet it makes reliable engagements with tooth spaces. Therefore, stopper 21 can block rotation of gears 7a and 8a completely, and release the blockage of rotation positively with a simple work.

Accordingly, installation of the torque detector can be made reliably. At the same time, the invention also prevents assembling errors, thereby improving the reliability.

Moreover, the invention can prevent first rotor 7 and second rotor 8 from shifting in their relative positions during transportation and installation of the sensor unit. It can thus provide the torque detector which is easy to mount and highly reliable.

(Fourth Exemplary Embodiment)

Figure 5A:
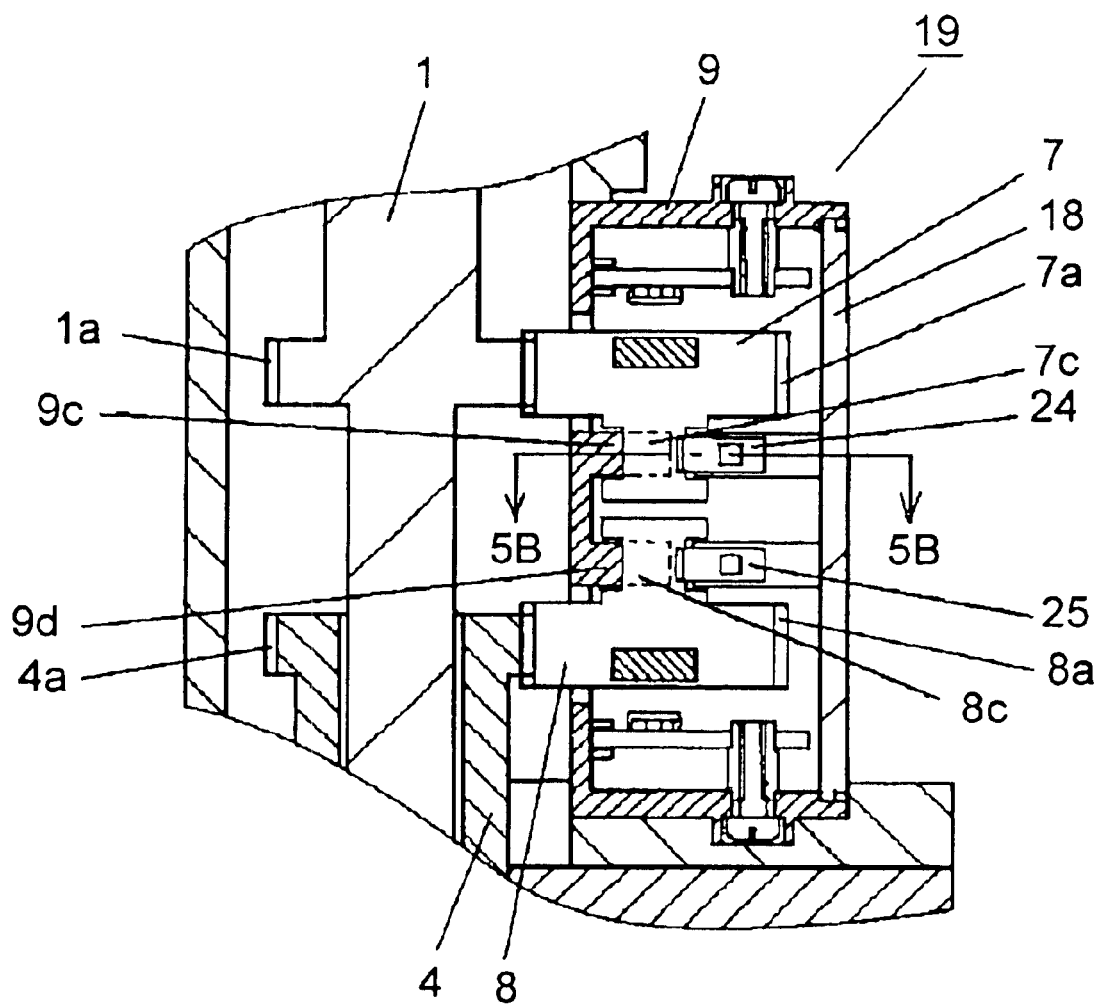
FIG. 5A is a sectional view of a torque detector according to a fourth exemplary embodiment of the present invention.
Figure 5B:
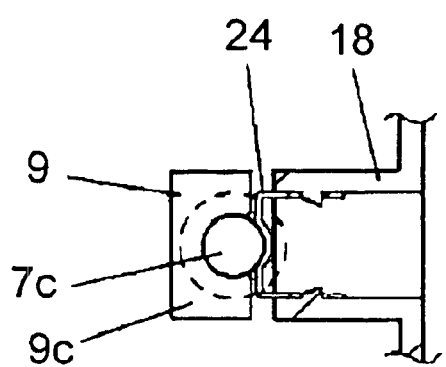
FIG. 5B is a sectioned view observed in a plane along a chain line toward arrows 5A—5A of the torque detector according to the fourth exemplary embodiment.

FIGS. 5A and 5B show a structure of sensor unit 19 in a torque detector according to a fourth exemplary embodiment of this invention.

In FIGS. 5A and 5B, sensor case 9 is made by plastic molding or the like, and it is provided with U-shaped bearings 9c and 9d having a sectional shape of a letter U. These U-shaped bearings 9c and 9d hold rotary shaft 7c of rotor 7 and rotary shaft 8c of rotor 8 respectively therein. In addition, rotary shafts 7c and 8c are pressed against the U-shaped open ends by leaf springs 24 and 25 respectively so that rotors 7 and 8 are retained rotatably, as shown In FIG. 5B. Here, leaf springs 24 and 25 are respectively retained by protrusions provided in sensor cover 18.

Because of this structure, in which bearings 9c and 9d are formed into the shape of the letter U as shown in FIG. 5B, these bearings can be constructed by using a split die when molding the sensor case with a plastic resin. In other words, it does not require a molding die of complex structure such as one equipped with a side core for molding bearings 9c and 9d of sensor case 9. This structure thus reduces cost of the components while maintaining the quality steadily.

Furthermore, since the sensor case requires no opening such as a hole for separation it from the molding die, this invention eases the task of hermetic seal using the case, avoids dust from entering inside, and thereby it improves reliability of the sensor.

(Fifth Exemplary Embodiment)

Figure 6:
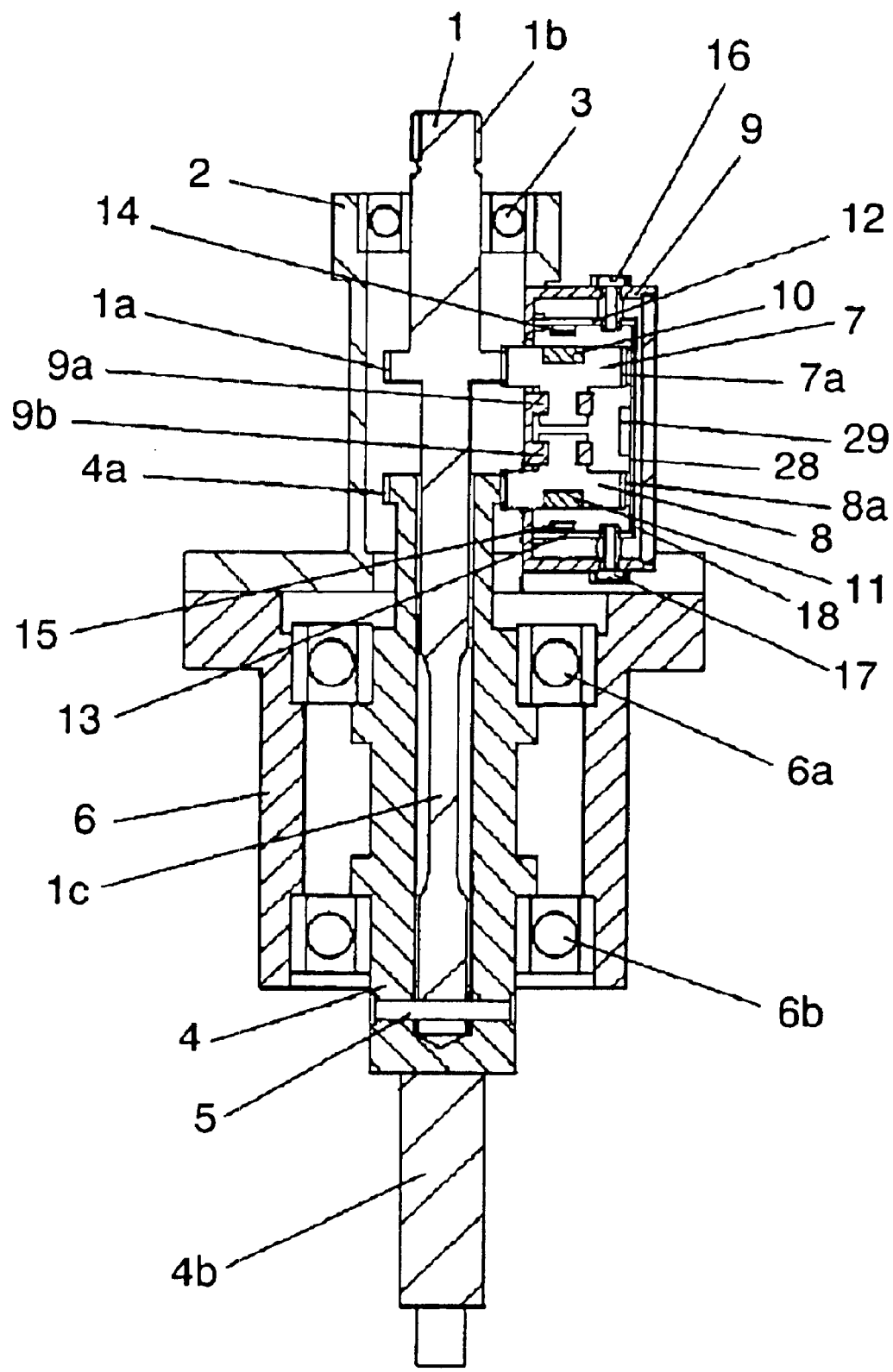
FIG. 6 is a sectional view of a torque detector according to a fifth exemplary embodiment of the present invention.
Figure 7:
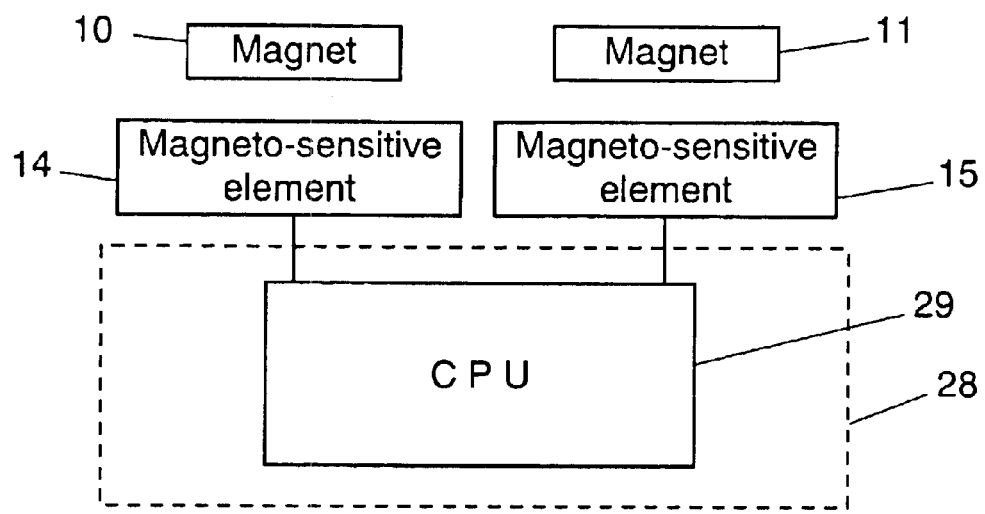
FIG. 7 is a block diagram illustrating a torque computing unit of the fifth exemplary embodiment.

FIG. 6 is a longitudinal sectional view of a torque detector according to a fifth exemplary embodiment of this invention. FIG. 7 is a block diagram illustrating magnets, magneto-sensitive elements, and a part for computing amount of torque in the fifth exemplary embodiment.

In this fifth exemplary embodiment, the torque detector has the same basic structure as that of the first exemplary embodiment, and description is therefore provided only of portions that differ from the first exemplary embodiment.

In FIG. 6 and FIG. 7, printed circuit board 28 housed inside sensor case 9 is connected with printed circuit boards 12 and 13, and provided with microcomputer 29 (hereinafter referred to as CPU) as a component for computing amount of torque.

The torque detector constructed as above operates in a manner which is described hereinafter.

When there is a load of certain amount placed on wheels, a counter-torque of this load acts upon input shaft 1 at the side of output shaft 4 to countervail against a turning torque of a steering wheel, as explained in the first exemplary embodiment. As a result, a twisting torque acts on input shaft 1. Consequently, rotation of gear 4a of output shaft 4 shifts in phase from gear 1a of input shaft 1, which causes a shift in phase of rotation between rotors 7 and 8 in proportion to an amount of the twist. Therefore, magnets 10 and 11 rotate individually in a manner that the directions of their magnetic fields shift with respect to each other. Accordingly, magneto-sensitive elements 14 and 15 produce outputs of such values that correspond to the shift in phase of the respective magnetic fields. CPU 29 receives outputs of magneto-sensitive elements 14 and 15 and compares them for a difference, to determine an amount of the twist that is the torque acting between input shaft 1 and output shaft 4.

As described in the first exemplary embodiment, magneto-sensitive elements 14 and 15 detect rotation angles of the rotors in analog values. Therefore, angles representing positions of input shaft 1 and output shaft 4 in their one complete rotation can be obtained from absolute values of the respective outputs of magneto-sensitive elements 14 and 15.

Assume that magneto-sensitive elements 14 and 15 are each comprised of a magneto-resistive element, of which an output varies only by a direction of magnetic field, when the magnetic field has a certain degree of strength. In this case, magneto-sensitive elements 14 and 15 produce stable outputs, even if changes occur in distances from magnets 10 and 11 to magneto-sensitive elements 14 and 15, or changes in strength of the magnetic fields due to characteristic variation of the magnets. Since magneto-sensitive elements 14 and 15 detect only changes in orientations of magnets 10 and 11 to produce their outputs in highly accurate analog values, the torque detector can detect the torque with high resolution.

Unlike the conventional method for incrementally detecting a number of changes in the magnetic field produced by a plurality of magnetic poles, the torque detector of this invention obtains outputs corresponding to the rotation angles continuously in analog values, as described above. Therefore, CPU 29 takes in a degree of angle of a relative twisting, and calculates an amount of the torque. With the simple structure, the torque detector can thus detect even absolute values of the rotation angles of input shaft 1 as well as output shaft 4.

Alternatively, the torque detector may include an electronic circuit instead of the CPU to calculate amount of torque.

Also, CPU 29 may be mounted to any one of printed circuit boards 12 and 13.

(Sixth Exemplary Embodiment)

Figure 8:
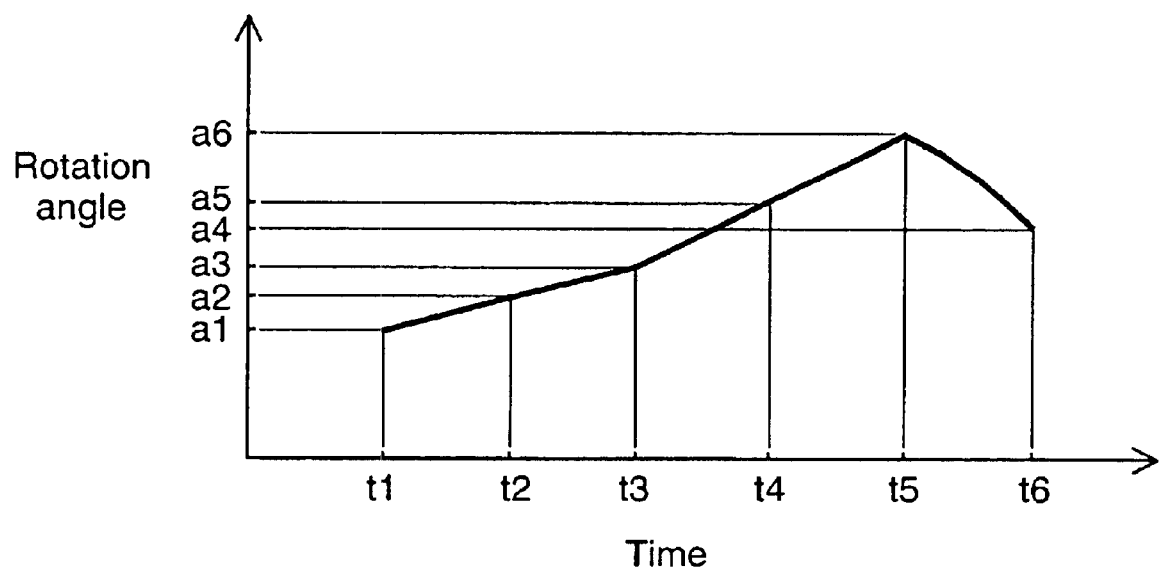
FIG. 8 is a graphical representation showing a method of computing a rotational speed of a rotor of a torque detector according to a sixth exemplary embodiment of this invention.

FIG. 8 is a graphical representation showing computation of a rotational speed of a rotor in a torque detector according to a sixth exemplary embodiment of this invention.

CPU 29 includes a rotating speed detector (not show in the figure) for receiving outputs of magneto-sensitive elements 14 and 15 at intervals of a constant time, and detecting rotational speeds of rotors.

In FIG. 8, graduations t1 through t6 represent the time intervals at which CPU 29 reads output of any of magneto-sensitive elements 14 and 15, and graduations a1 through a6 represent rotation angles at the intervals of t1 through t6 respectively.

Herein, CPU 29 takes in outputs of magneto-sensitive elements 14 and 15 at the constant time intervals. Therefore, a rotational speed between t1 and t2, for instance, can be expressed as:

rotational speed=$(a2-a1)/(t2-t1)$.

Rotational speeds through t6 are also obtained in the same manner. In addition, rates of rotational acceleration in these time intervals can be obtained from changes in the rotational speed between the time intervals as expressed by:

a rate of acceleration=$((\text{rotational speed between } t2 \text{ and } t3)-(\text{rotational speed between } t1 \text{ and } t2))/(t3-t2)$.

Although the time intervals to read the rotation angles are given constant in this exemplary embodiment, they need not be constant as long as the time intervals are controllable by CPU 29.

(Seventh Exemplary Embodiment)

Figure 9A:
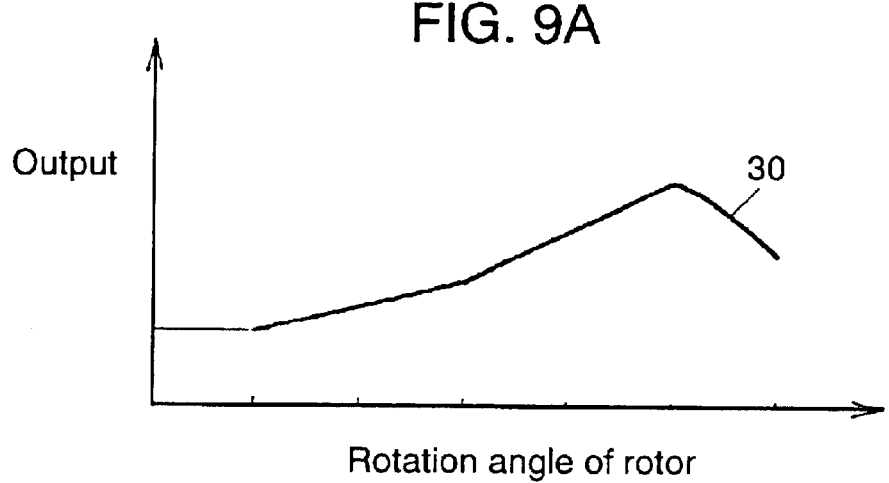
FIG. 9A and FIG. 9B illustrate operation of a correction unit of a torque detector according to a seventh exemplary embodiment of the present invention.
Figure 9B:
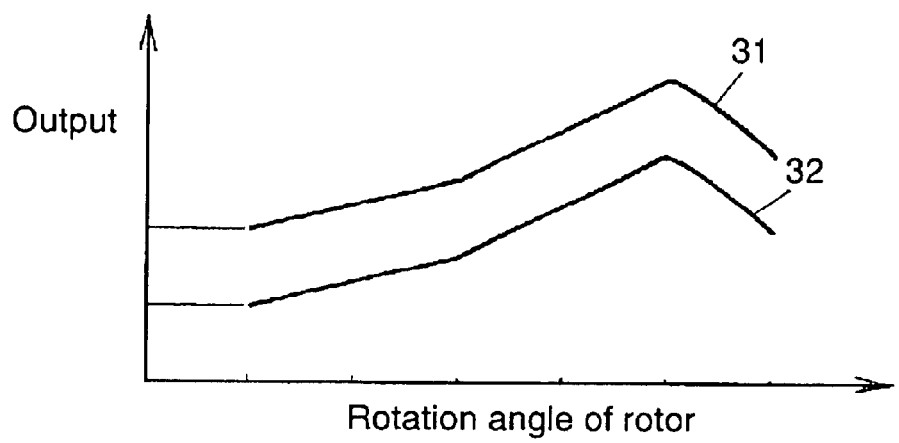
Figure 10:
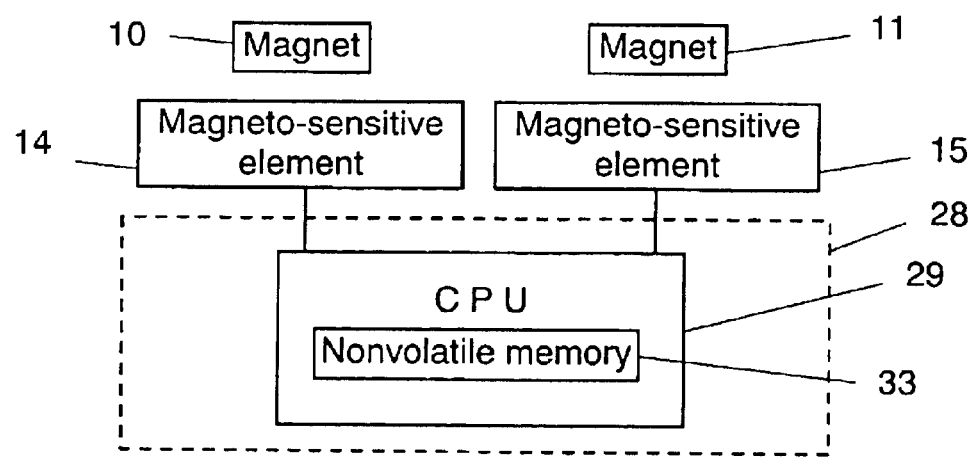
FIG. 10 is a block diagram of the correction unit for computing and correcting an amount of torque according to the seventh exemplary embodiment of the present invention.

FIG. 9A and FIG. 9B are graphs showing operation of a correction unit in a torque detector according to a seventh exemplary embodiment. FIG. 10 is a block diagram illustrating magnets, magneto-sensitive elements, and a part for computing a deviation when there is no torque.

In FIG. 10, the same reference symbols as those of FIG. 3 are used to denote like components as described in the above exemplary embodiments, and description of them will be skipped.

In FIG. 9A, data 30 represents outputs of magneto-sensitive elements 14 and 15 showing an example in which the two outputs change in identical manner.

In FIG. 9B, data 31 represents changes in output of magneto-sensitive element 14, and data 32 represents changes in output of magneto-sensitive element 15 in another example.

CPU 29 in FIG. 10 includes nonvolatile memory 33.

When there is no difference in rotation angle between rotors 7 and 8, the outputs of two magneto-sensitive elements 14 and 15 become identical as represented by data 30 shown in FIG. 9A.

FIG. 9B shows a case in which rotors 7 and 8 are so placed that magnets 10 and 11 are not in the same orientation when there is no torque. In this case, nonvolatile memory 33 stores a difference between output 31 of magneto-sensitive element 14 and output 32 of magneto-sensitive element 15 when the device is manufactured. This difference of the outputs corresponds to a difference in angle of the orientation between magnets 10 and 11, or the rotation angle between rotors 7 and 8.

When CPU 29 computes an amount of torque, it reads the above difference, denoted by symbol "x", from nonvolatile memory 33, and subtracts the difference "x" from a difference in output between magneto-sensitive elements 14 and 15. CPU 29 can thus compute the amount of torque in value equivalent to the case in which rotors 7 and 8 are in the same angular orientation as shown in FIG. 9A.

In this embodiment, nonvolatile memory 33 may be provided outside of CPU 29.

The angular difference "x" can be revised at all times by programming nonvolatile memory 33 so that it repeats storing a new value whenever the torque becomes zero.

In addition, the torque detector can detect a change in torque from a given state to another state, if it stores in nonvolatile memory 33 a difference in output between magneto-sensitive elements 14 and 15 corresponding to a difference of rotation angles between rotors 7 and 8 at a time of the given state when there is a certain amount of the torque.

As described above, the torque detector can detect accurate amount of torque without requiring a positional alignment between the first and the second rotors while the rotors are free from any torque.

(Eighth Exemplary Embodiment)

Figure 11:
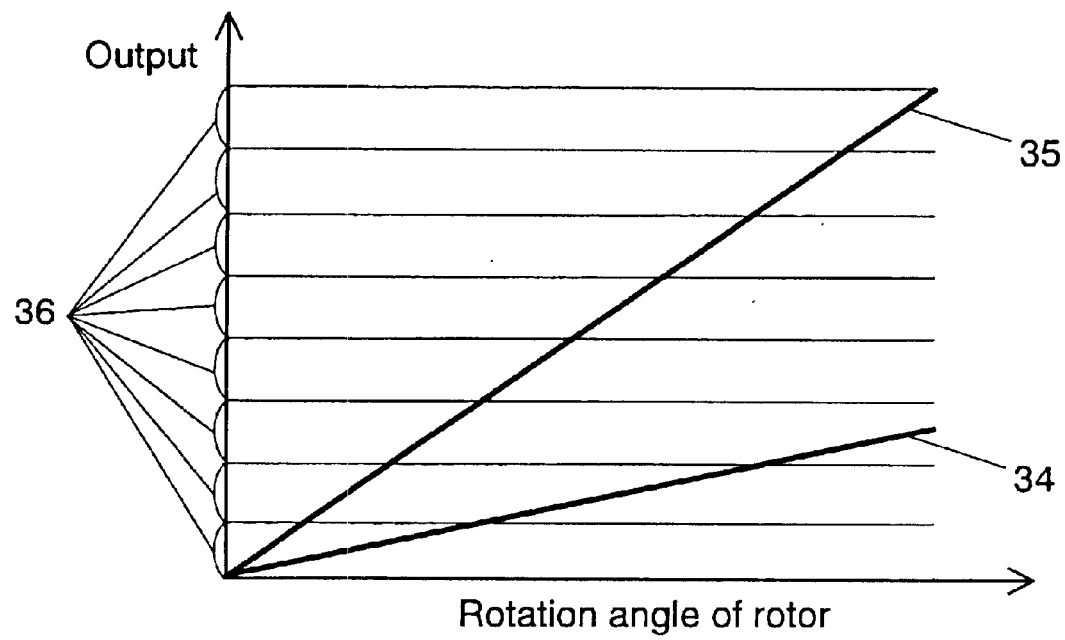
FIG. 11 illustrates operation of a torque detector according to an eighth exemplary embodiment of the present invention.

FIG. 11 is a graphical representation showing an example of changes in output of first magneto-sensitive element 14 and output of a third magneto-sensitive element in proportion to rotation angle of rotors.

In FIG. 11, data 34 represents an output of first magneto-sensitive element 14, data 35 represents an output of the third magneto-sensitive element, and increments 36 of the output represent resolution of an A/D converter.

Although not shown in FIG. 1, the torque detector is provided with a third rotor equipped with a third magnet. In addition, a third magneto-sensitive element, also not shown in FIG. 1, is provided for detecting magnetic field produced by the third magnet.

The third rotor is linked to first rotor 7 through a gear, and rotates at a higher speed. Therefore, output 35 of the third magneto-sensitive element shows a steeper change than output 34 of first magneto-sensitive element 14, as shown in FIG. 11. These outputs of the magneto-sensitive elements are A–D converted by an analog-to-digital (A/D) converter included in CPU 29. When first rotor 7 turns, the third magneto-sensitive element produces output of steeper change than that of first magneto-sensitive element 14. For this reason, the torque detector can detect the rotation angle more precisely even if resolution 36 of the A/D converter remains the same. This exemplary embodiment can thus make the torque detector capable of detecting the rotation angle, rotational speed and rotation acceleration with higher resolution.

If the third rotor is linked to second rotor 8, the torque detector is made possible to detect the rotation angle, rotational speed and rotation acceleration with higher resolution than those detected from rotation of second rotor 8.

In this instance here, the third rotor may be retained by a bearing provided in sensor cover 18. Sensor cover 18 is then mounted to sensor case 9 so that the third rotor is linked to any of the first rotor and the second rotor with gears. The third magneto-sensitive element may be mounted to any of printed circuit boards 12 and 13, for instance.

Furthermore, the torque detector can be made capable of detecting amount of torque more accurately when additional combination of rotor and magneto-sensitive element is connected respectively to both of the first and the second rotors.

(Ninth Exemplary Embodiment)

Figure 12:
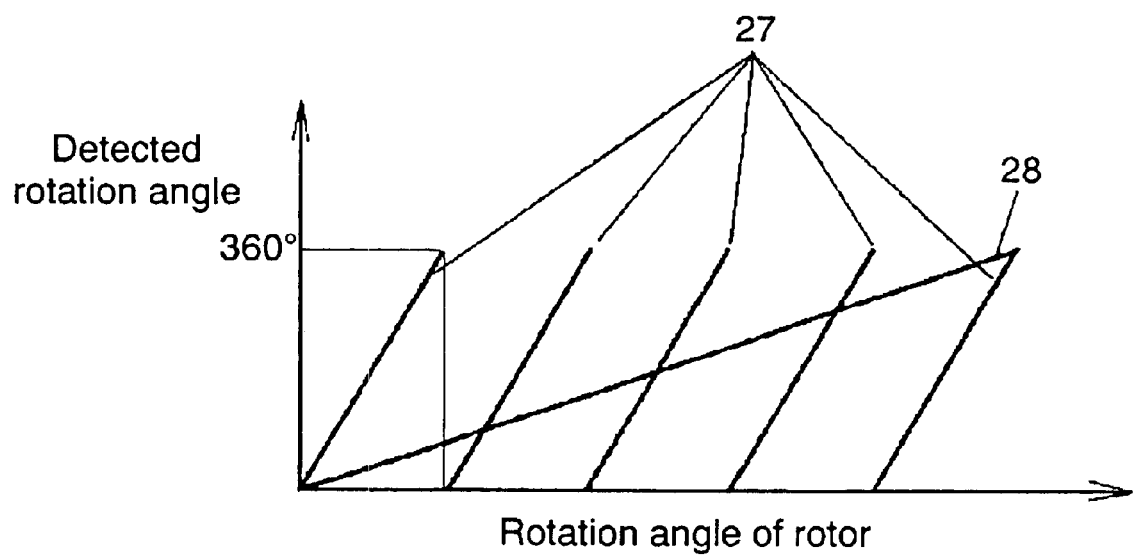
FIG. 12 is illustrates operation of a torque detector according to a ninth exemplary embodiment of the present invention.
Figure 13:
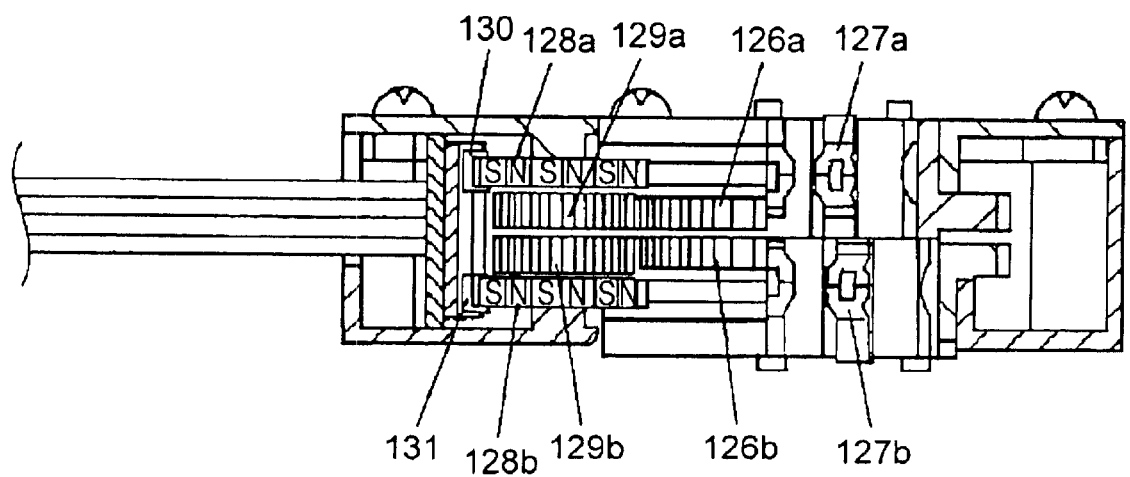
FIG. 13 is illustrates a structure of a torque detector of the prior art.

FIG. 12 is a graphical representation showing an example of output of the above first magneto-sensitive element and output of a fourth magneto-sensitive element.

In FIG. 12, data 27 represents angle data computed from output of the first magneto-sensitive element, and data 28 represents angle data computed from output of the fourth magneto-sensitive element.

Although not shown in FIG. 1, the torque detector is provided with a fourth rotor equipped with a fourth magnet. In addition, it is provided with a fourth magneto-sensitive element, though not shown in FIG. 1, for detecting magnetic field produced by the fourth magnet.

The fourth rotor is linked to first rotor 7 through a gear, and rotates at a lower speed. Therefore, angle data 28 computed from the output of the fourth magneto-sensitive element shows a slower change than output 27 of first magneto-sensitive element 14, as shown in FIG. 12.

When the first rotor turns 360° or more, the angle data calculated by CPU 29 from the output of first magneto-sensitive element 14 repeats the same change beyond the rotation of 360°.

On the other hand, the angle data calculated by CPU 29 from the output of the fourth magneto-sensitive element shows the same change for a number of times while the first rotor turns 360°, as shown in FIG. 12. This structure can thus make possible for the detector to determine as to which number of turns the first rotor has made, based on the angle data calculated from the output of the fourth magneto-sensitive element before the data goes back to 0°, even when the power supply is cut during rotation of the rotor. The torque detector can be thus made capable of detecting absolute rotation angle of the first rotor.

As described, the torque detector can detect the rotation angle of the rotor in a range beyond 360°. Alternatively, the fourth rotor may be linked to second rotor 8.

Herein, the fourth rotor may be retained by a bearing provided in sensor cover 18. Sensor cover 18 is then mounted to sensor case 9 so that the fourth rotor is linked to any of the first rotor and the second rotor with gears. The fourth magneto-sensitive element may be mounted to any of printed circuit boards 12 and 13, for instance.

If one of magneto-sensitive elements for detecting rotation of two linked rotors, either the first magneto-sensitive element or the fourth magneto-sensitive element for example fails to function, the failed magneto-sensitive element changes its output whereas the other does not.

Therefore, CPU 29 can diagnose the failure of the magneto-sensitive element if it is provided with a diagnostic unit for determining the above change.

CPU 29 can also determine a failure of any of magneto-sensitive elements for detecting rotation of two un-linked rotors, or one of the first magneto-sensitive element and the second magneto-sensitive element for example, when their outputs indicate a torque of a value which is physically improbable. Accordingly, CPU 29 can judge any such failures when it is provided with of a diagnostic unit for determining development of an unusual amount of torque as discussed above.

CPU 29 may also be adaptable for diagnosis of other failures such as malfunction of rotors beside failures of the magneto-sensitive elements.

INDUSTRIAL APPLICABILITY

As described above, the present invention provides a torque detector of high accuracy with capability of detecting a rotation angle and rotational speed of a shaft at the same time with detection of a torque.

What is claimed is:

1. A torque detector comprising:
    a case;
    bearings provided in the case;
    a first rotor provided with a gear on outer periphery thereof, and retained in a rotatable manner by one of the bearings;
    a second rotor provided with a gear on outer periphery thereof, and retained in a rotatable manner by another of the bearings;
    a first magnet having a pair of magnetic poles, and disposed to an end of the first rotor;
    a second magnet having a pair of magnetic poles, and disposed to an end of the second rotor;
    a first magneto-sensitive element for detecting a magnetic field produced by the first magnet, the first magneto-sensitive element placed along an axial direction of the first rotor in a manner to face the first magnet with a predetermined space;
    a second magneto-sensitive element for detecting magnetic field produced by the second magnet, the second magneto-sensitive element placed along an axial direction of the second rotor in a manner to face the second magnet with a predetermined space;
    an input shaft provided with a gear in engagement with the gear on the first rotor; and
    an output shaft provided with a gear in engagement with the gear on the second rotor, the output shaft connected to one end of the input shaft,
    wherein the torque detector obtains an amount of relative rotational displacement, if the relative rotational displacement occurs between the input shaft and the output shaft, based on a first detection signal output by the first magneto-sensitive element responsive to the magnetic field of the first magnet and a second detection signal output by the second magneto-sensitive element responsive to the magnetic field of the second magnet.

2. The torque detector according to claim 1, wherein the first rotor and the second rotor are flexibly connected with a flexible member, and
    the flexible member uses flexibility thereof for thrusting the first rotor and the second rotor in their rotational directions opposite to each other as well as directions of their rotational axis.

3. The torque detector according to claim 1, further comprising:
    a flexible member disposed to the case, the flexible member having flexibility acting outward from an axis of the first rotor and the second rotor;
    a stopper being thrust by the flexible member in a direction of disengagement from respective tooth spaces of the gears on the first rotor and the second rotor; and
    a screw disposed to the case for shifting the stopper in a direction opposite to a direction of thrust provided by the flexible member.

4. The torque detector according to claim 1, wherein each of the bearings comprises an inner part and an outer part,
    the inner part is provided with a groove portion in a shape of generally a letter U for holding a rotary shaft of each of the first rotor and the second rotor, and
    the outer part is provided with a flexible member having flexibility for thrusting the rotary shaft of each of the first rotor and the second rotor in a direction of the groove portion.

5. The torque detector according to claim 1, further comprising a torque computing unit for receiving the first detection signal and the second detection signal, and computing an amount of torque corresponding to the relative rotational displacement.

6. The torque detector according to claim 5, wherein the first magneto-sensitive element and the second magneto-sensitive element comprise anisotropic magneto-resistive elements, of which outputs change only according to a direction of magnetic field.

7. The torque detector according to claim 5, further comprising a rotating speed detector for detecting at least one of a rotational speed of the first rotor based on a level of change of the first detection signal and a rotational speed of the second rotor based on a level of change of the second detection signal.

8. The torque detector according to claim 5, further comprising a correction unit including a memory for storing an amount of correction used to correct a deviation between the first detection signal and the second detection signal when there is no torque.

9. The torque detector according to claim 5, further comprising:
    a third rotor in engagement with at least one of the first rotor and the second rotor for rotation at a high speed driven by at least one of the first rotor and the second rotor;
    a third magnet disposed to an end of the third rotor in a manner to change a direction of magnetic field according to rotation of the third rotor; and
    a third magneto-sensitive element placed along an axial direction of the third rotor in a manner to face the third magnet with a predetermined space, for detecting a magnetic field produced by the third magnet, and outputting a third detection signal corresponding to the magnetic field of the third magnet to the torque computing unit.

10. The torque detector according to claim 5, further comprising:
    a fourth rotor in engagement with at least one of the first rotor and the second rotor for rotation at a low speed driven by at least one of the first rotor and the second rotor;
    a fourth magnet disposed to an end of the fourth rotor in a manner to change a direction of a magnetic field according to rotation of the fourth rotor; and
    a fourth magneto-sensitive element placed along an axial direction of the fourth rotor in a manner to face the fourth magnet with a predetermined space, for detecting a magnetic field produced by the fourth magnet, and outputting a fourth detection signal corresponding to the magnetic field of the fourth magnet to the torque computing component.

11. The torque detector according to claim 9, further comprising a diagnostic unit for detecting a failure of any of the first through the third magneto-sensitive elements.

12. The torque detector according to claim 10, further comprising a diagnostic unit for detecting a failure of any of the first through the fourth magneto-sensitive elements.

* * * * *